(12) United States Patent
Mueller et al.

(10) Patent No.: US 7,596,944 B2
(45) Date of Patent: Oct. 6, 2009

(54) MIXING ELEMENT FOR AN EXHAUST GAS SYSTEM

(75) Inventors: Manfred Mueller, Baltmannsweiler (DE); Juergen Kobe, Nuertingen (DE); Joachim Braun, Esslingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 174 days.

(21) Appl. No.: 11/526,143

(22) Filed: Sep. 22, 2006

(65) Prior Publication Data

US 2007/0068150 A1 Mar. 29, 2007

(30) Foreign Application Priority Data

Sep. 27, 2005 (DE) .................... 10 2005 046 316

(51) Int. Cl.
*F01N 3/00* (2006.01)

(52) U.S. Cl. ............... 60/323; 60/272; 60/305; 60/312; 60/313

(58) Field of Classification Search ......... 60/286, 60/272, 312, 313, 314, 322, 323, 324
See application file for complete search history.

(56) References Cited

U.S. PATENT DOCUMENTS

| 3,072,214 | A | * | 1/1963 | Deremer | 181/250 |
| 4,342,195 | A | * | 8/1982 | Lo | 60/313 |
| 4,867,270 | A | * | 9/1989 | Wissmann et al. | 181/231 |
| 4,926,634 | A | * | 5/1990 | Putz et al. | 60/274 |
| 4,947,645 | A | | 8/1990 | Pemberton | |
| 4,953,352 | A | * | 9/1990 | Campbell | 60/313 |
| 5,018,349 | A | * | 5/1991 | Pemberton | 60/313 |
| 5,144,799 | A | * | 9/1992 | Barth | 60/313 |
| 6,247,305 | B1 | | 6/2001 | Bassani | |
| 6,546,720 | B2 | * | 4/2003 | van Nieuwstadt | 60/286 |
| 6,557,341 | B2 | * | 5/2003 | Bubeck et al. | 60/284 |
| 6,889,499 | B2 | * | 5/2005 | Bassani | 60/312 |
| 2003/0005688 | A1 | | 1/2003 | Bassani | |

FOREIGN PATENT DOCUMENTS

| DE | 69 12 770 U | 8/1969 |
| DE | 37 21 810 A1 | 1/1989 |
| DE | 3721810 | 1/1989 |
| DE | 100 08 458 B1 | 11/2000 |
| JP | 2002 089 245 A | 3/2002 |
| WO | 88/04358 A | 6/1988 |

* cited by examiner

*Primary Examiner*—Binh Q. Tran
(74) *Attorney, Agent, or Firm*—Howard IP Law Group, PC

(57) ABSTRACT

The present invention relates to a mixing element and an exhaust system of an internal combustion engine. The mixing element has two inlet openings and two outlet openings, wherein each inlet opening communicates with both outlet openings.

16 Claims, 3 Drawing Sheets

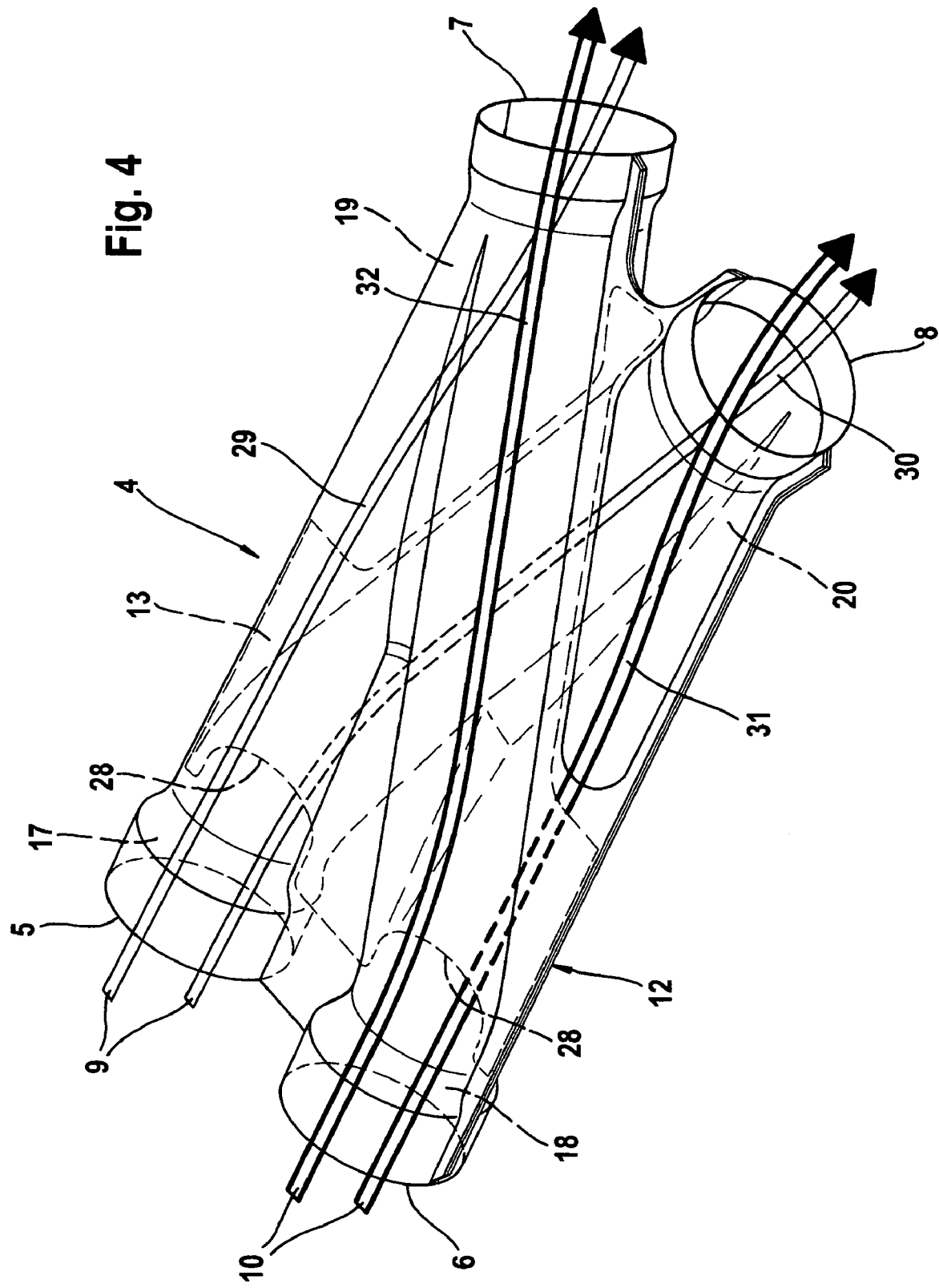

MIXING ELEMENT FOR AN EXHAUST GAS SYSTEM

FIELD OF THE INVENTION

The present invention relates to a mixing element for an exhaust gas system of an internal combustion engine. The invention also relates to an exhaust gas system equipped with such a mixing element.

BACKGROUND OF THE INVENTION

Exhaust gas systems of internal combustion engines may be designed as dual flow, i.e., having two separate exhaust gas lines carrying the exhaust gases away from the internal combustion engine in parallel. For example, dual-flow exhaust gas systems are expedient with V-type engines to remove the exhaust gases from the two cylinder banks separately. In addition, to reduce emissions of pollutants, it is customary to provide the exhaust system with exhaust gas purification devices such as catalytic converters and particulate filters. To check proper functioning of such exhaust gas treatment devices, a corresponding sensor and/or a corresponding probe can be provided in the exhaust line downstream from the respective device. With the help of this probe and/or sensor, for example, the residual presence of certain pollutants in the exhaust gas may be detected. This function test is of growing importance in catalytic converter arrangements in which a catalytic converter having selective catalytic reduction, referred to with the abbreviation SCR catalytic converter, follows an oxidation catalyst, whereby ammonia or urea which is converted to ammonia because of the high exhaust temperatures, is introduced upstream from the SCR catalytic converter. With the help of a corresponding sensor, it is thus possible to ascertain downstream from the catalytic converter arrangement whether a residual amount of ammonia or urea is contained in the exhaust. Depending on this measurement, proper functioning of the catalytic converter arrangement can be evaluated. If necessary, it is also possible to intervene in the control or regulation of the catalytic converter arrangement accordingly.

In the case of dual-flow exhaust systems which contain a separate catalytic converter arrangement in each exhaust line, it is fundamentally possible to arrange a corresponding probe in the exhaust line downstream from the respective catalytic converter arrangement. Such probes or sensors are comparatively expensive, however, in particular the associated expense for installation and for the analyzer circuits.

SUMMARY OF THE INVENTION

This invention is concerned with the problem of providing in a dual-flow exhaust gas system, the function monitoring of catalytic converter arrangements in exhaust lines less expensively.

This invention is based on the general idea of providing a mixing element for a dual-flow exhaust gas system, where this mixing element can be used in the two exhaust lines of a dual-flow exhaust gas system through two inlet openings and two outlet openings, whereby the four openings mentioned above are interconnected in the mixing element in such a way that each inlet opening is connected to two outlet openings. The exhaust gases entering the mixing element through the one inlet opening thus emerge from the mixing element through both outlet openings. Likewise, the exhaust gases entering the mixing element through the other inlet opening also emerge from the mixing element through both outlet openings. For the dual-flow exhaust gas system equipped with this mixing element, the exhaust gases carried through the one exhaust line to the mixing element flow in both exhaust lines downstream from the mixing element. Similarly, this is true for the other exhaust line, whose exhaust gases, when supplied to the mixing element, flow in both exhaust lines downstream from the mixing element. The use of such a mixing element thus results in a gas mixture emerging from both outlet openings downstream from the mixing element such that this gas mixture is formed from the two individual gas streams that are sent separately to the two inlet openings. As a result, a portion of the exhaust gases of the one exhaust line as well as a portion of the exhaust gases of the other exhaust line flow in both exhaust lines downstream from the mixing element. A sensor mounted downstream from the mixing element can thus analyze the exhaust gases of both exhaust lines running upstream from the mixing element. A malfunction in one or the other or in both catalytic converter arrangements of the two exhaust lines can thus be detected with the help of only a single sensor. Accordingly, this makes it possible to reduce the manufacturing cost for a dual-flow exhaust system.

According to an embodiment, the mixing element contains a channel system connecting each inlet opening to the two outlet openings via two separate channels. In this way, a predetermined mixing ratio can be achieved between the two exhaust gas streams supplied in the two exhaust gas streams that are discharged. In addition, the flow resistance of the mixing element can be reduced with such a channel system.

It is self-evident that the features mentioned above and those to be explained in greater detail below may be used not only in the specific combination given but also in other combinations or even alone without going beyond the scope of the present invention.

Preferred exemplary embodiments of the invention are illustrated in the drawings and are explained in greater detail in the following description, whereby the same reference numerals are used for the same or similar or functionally similar components.

BRIEF DESCRIPTION OF THE DRAWINGS

The drawings show, each in schematic diagrams.

DETAILED DESCRIPTION OF THE INVENTION

Figure 1:
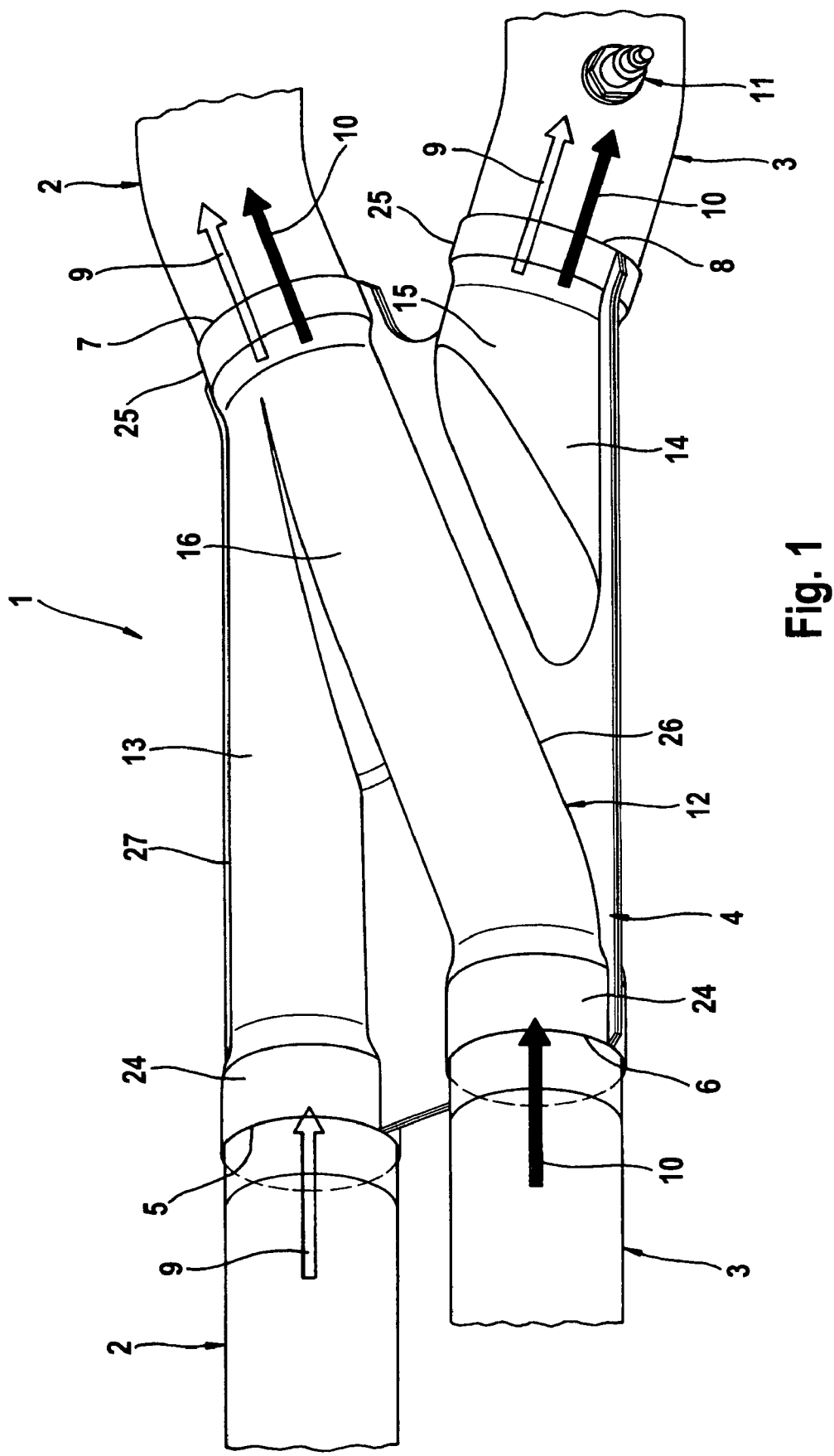
FIG. 1 a simplified perspective view of an exhaust system in the area of a mixing element, FIG. 2 a top view of the mixing element, FIG. 3 a longitudinal section through the mixing element, FIG. 4 another perspective view of the mixing element that has been simplified further.

According to FIG. 1, a dual-flow exhaust gas system 1 has two exhaust lines 2, 3 which carry exhaust gases away from an internal combustion engine (not shown) such as the type installed in a motor vehicle. The two exhaust lines 2, 3 are linked together by a mixing element 4. The two exhaust lines 2, 3 lead separately to the mixing element 4 and also lead separately away from the mixing element 4. Accordingly, the mixing element 4 has two inlet openings, namely a first inlet opening 5 assigned to the first exhaust line 2 and a second inlet opening 6 assigned to the second exhaust line 3. In addition, two outlet openings are also provided, namely a first outlet opening 7 assigned to the first exhaust line 2 and a second outlet opening 8 assigned to the second exhaust line 3. This mixing element 4 is adapted so that each of the inlet openings 5, 6 communicate with both outlet openings 7, 8. As a result, a first exhaust gas stream 9, which is supplied through the first exhaust line 2 upstream from the mixing element 4 and is represented by the contoured arrows in FIG. 1, can be found downstream from the mixing element 4 in both exhaust lines 2, 3. Accordingly, the same is also true of a second exhaust gas stream 10 which is supplied to the mixing element 4 through the second exhaust line 3 and is represented by the solid arrows in FIG. 1. This is also found downstream from the mixing element 4 in both exhaust lines 2, 3. It is fundamentally clear that the directions of flow which are shown here as examples may also be reversed.

In an exemplary application of the dual-flow exhaust system 1, a catalytic converter arrangement (not shown here) is installed in each exhaust line 2, 3 upstream from the mixing element 4. For example, such a catalytic converter arrangement includes an oxidation catalytic converter and an SCR catalytic converter arranged downstream from the former. In addition, the catalytic converter arrangement may also be equipped with a urea supply device which introduces urea into the respective exhaust line 2, 3 upstream from the SCR catalytic converter. During operation of the exhaust system 1, urea sprayed into the exhaust is converted to ammonia because of the high prevailing operating temperatures. With the help of ammonia, nitrogen oxides can be reduced to nitrogen and water in the SCR catalytic converter.

In the case of a malfunction of the catalytic converter arrangement, unwanted pollutants and/or pollutants in undesirably high concentrations can be detected in the exhaust gas stream 9, 10 downstream from the catalytic converter arrangement. For example, a malfunction of the catalytic converter arrangement in the exhaust gas, as explained above as an example, can lead to an undesirably high urea or ammonia content in the exhaust gas.

The mixing element 4 provided here offers the option of analyzing the exhaust gases 9, 10 of both exhaust lines 2, 3 downstream from the mixing element 4 with the help of a single sensor 11. Downstream from the mixing element 4, an exhaust gas mixture composed of the exhaust gases 9, 10 of the two exhaust lines 2, 3 upstream from the mixing element 4 prevails in each exhaust line 2, 3. For example, if a malfunction occurs in the SCR catalytic converter and/or the urea supply device should malfunction in one of the two exhaust lines 2, 3, leading to an excessive urea or ammonia content in the exhaust gas 9, 10 downstream from the respective catalytic converter arrangement, this can be ascertained with the help of the probe 11 if the concentration of ammonia and/or urea is high enough, and this may be accomplished regardless of whether the sensor 11 is in the first exhaust line 2 or in the second exhaust line 3. It is clear that essentially multiple sensors 11 or probes 11 may be provided that are specialized with regard to different analyses or are redundant.

According to FIG. 1 through FIG. 4, the mixing element 4 includes a channel system 12. This channel system 12 includes a total of four channels. A first channel 13 connects the first inlet opening 5 to the first outlet opening 7. The first channel 13 runs essentially in a straight line and perpendicular to the opening plane of the first inlet opening 5. With regard to the essentially rectangular basic shape of the mixing element 4 (see the views from above in FIG. 2 and FIG. 3), the first channel 13 runs essentially in the longitudinal direction of the mixing element 4.

A second channel 14 connects the second inlet opening 16 to the second outlet opening 8. The second channel 14 also extends essentially in a straight line and perpendicular to the opening plane of the second inlet opening 6. The second channel 14 thus likewise extends in its longitudinal direction with regard to the rectangular shape of the mixing element 4.

A third channel 15 connects the first inlet opening 5 to the second outlet opening 8. The third channel 15 thus extends essentially diagonally to the rectangular basic shape of the mixing channel 4. A longitudinal direction of the third channel 15 thus extends essentially perpendicular to an opening plane of the second outlet opening 8.

A fourth channel 16 connects the second inlet opening 6 to the first outlet opening 7. With regard to the basic rectangular shape of the mixing element 4, the fourth channel 16 also runs diagonally. The longitudinal direction of the fourth channel 16 in particular stands essentially perpendicular to an opening plane of the first outlet opening 7.

The channel system 12 thus includes four channels 13 through 16 for each opening 5 through 8 for separate connection to the two opposite openings 5 through 8. The first inlet opening 5 is thus connected by the first channel 13 to the first outlet opening 7 and, independently thereof, is connected to the second outlet opening 8 via the third channel 15. The second inlet opening 6 is connected to the first outlet opening 7 via the fourth channel 16 and, independently thereof, is also connected to the second outlet opening 8 via the second channel 14. The first outlet opening 7 is connected to the first inlet opening 5 via the first channel 13 and, independently thereof, is also connected to the second inlet opening 6 via the fourth channel 16. The second outlet opening 8 is connected to the second inlet opening 6 via the second channel 14 and, independently thereof, is also connected to the first inlet opening 5 via the third channel 15.

Figure 2:
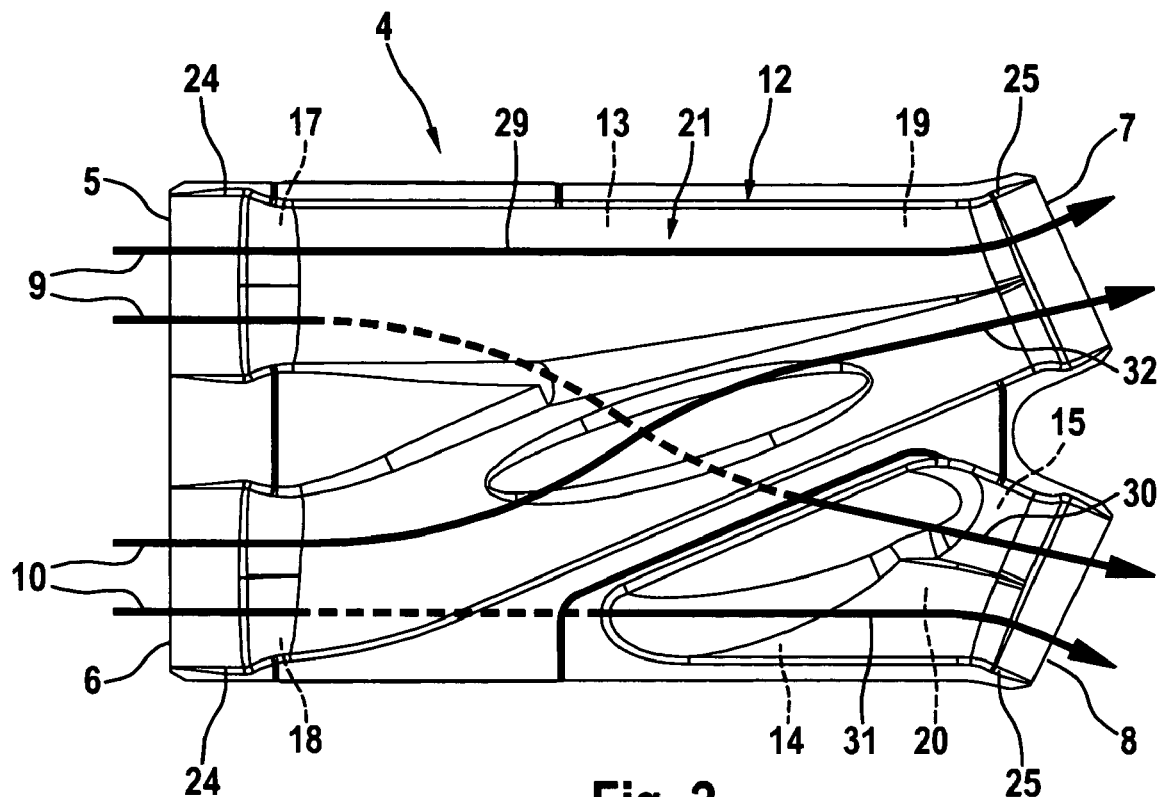
Figure 3:
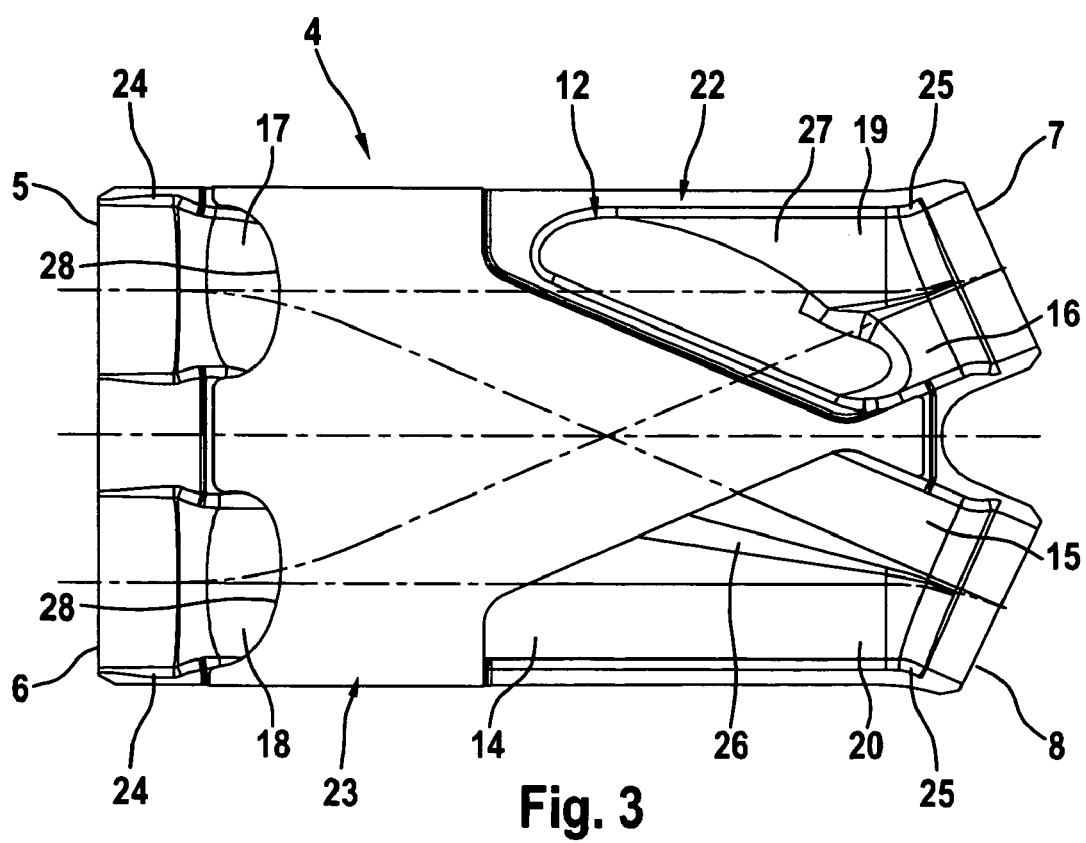

According to FIG. 2 through FIG. 4, the mixing element 2 has an inlet space for each inlet opening 5, 6, namely a first inlet space 17 and a second inlet space 18. Similarly, an outlet space is provided for each outlet opening 7, 8, namely a first outlet space 19 and a second outlet space 20. The first channel 13 and the third channel 15 branch off from the first inlet space 17 to the outlet openings 7, 8. The second channel 14 and the fourth channel 16 branch off from the second inlet space 18 to the outlet openings 7, 8. The first channel 13 and the fourth channel 16 open into the first outlet space 19. The second channel 14 and the third channel 15 open into the second outlet space 20.

It can be seen clearly in FIG. 1 through FIG. 4 that with each opening 5 through 8, the two respective channels 13 through 16 are arranged in the form of a Y. In addition, two of the four channels, namely the first channel 13 and the second channel 14, run essentially parallel to one another. These two channels 13, 14 extend separately from one another in such a way that the exhaust gas streams flowing through channels 13, 14 do not mix with one another.

The two other channels 15, 16 are arranged in such a way that they intersect one another, i.e., the two channels 15, 16 intersect in the form of an X as seen from above in FIG. 2 and FIG. 3. The channel system 12 for these two channels 15, 16 is also adapted so that exhaust gas streams that flow through these two channels 15, 16 do not mix with one another in the mixing element 4.

According to an embodiment of the invention, the channel system 12 is adapted so that all four channels 13 through 16 have flow cross sections of approximately the same size. This should achieve the result that the two exhaust gas streams 9, 10 supplied to the mixing element 4 are divided uniformly, i.e., in halves, at the inlet end of the mixing element 4 and then recombine at the outlet end of the mixing element 4 to form exhaust gas streams of the same size again.

According to FIG. 2 and FIG. 3, the mixing element 4 is preferably assembled from two half-shells, namely an upper shell 21, which is visible in FIG. 2 and a lower shell 22 which is visible in FIG. 3. In addition, an insertion plate 23 is also provided between the two half-shells 21, 22. The section in FIG. 3 is adapted so that the insertion plate 23 is not visible. It can be seen here that the insertion plate 23 is of such dimensions that it extends to the outside along the longitudinal sides of the mixing channel 4 and is integrated into a section of the longitudinal edge of the mixing element 4. The half-shells 21, 22 are attached to one another along the edge and are also mounted on the insertion plate 23 in said edge section, e.g., by welding and/or soldering.

The half-shells 21, 22 are expediently configured as deep drawn parts and preferably as identical parts. Each half-shell 21, 22 comprises two inlet opening sections 24, two outlet opening sections 25 and two channel sections 26, 27. The channel sections 26, 27 are each open toward the other half-shell 21, 22. In the upper shell 21, the two channel sections 26, 27 connect the first outlet opening 7 to both inlet openings 5, 6, and in the bottom shell 22, they connect the second outlet opening 8 to both inlet openings 5, 6.

The insertion plate 23 is shaped so that it closes each channel section 26, 27 with respect to the other half-shell 21, 22 in the installed state, but only in the sections of channels 13 through 16 that are between the inlet spaces 17, 18 and the outlet spaces 19, 20. In addition, in the inlet spaces 17, 18, each insertion plate 23 forms an oncoming flow edge 28 on which the oncoming exhaust gas stream 9, 10 is divided into the two channels 13 through 16 leading away from the respective inlet space 17, 18.

In FIG. 2 and FIG. 4, the flow path inside the mixing element 4 is illustrated by corresponding flow arrows. In the first inlet space 17, the first exhaust gas stream 9 supplied through the first exhaust line 2 is divided into a first substream 29 and a second substream 30. The first substream 29 follows the first channel 13 and emerges from the mixing element 4 through the first outlet opening 7 via the first outlet space 19. The second substream 30 follows the third channel 15 and emerges from the mixing element 4 through the second outlet opening 8 via the second outlet space 20. In the second inlet space 18, the second exhaust gas stream 10 supplied via the second exhaust line 3 is divided into a third substream 31 and a fourth substream 32. The third substream 31 passes through the second channel 14 into the second outlet space 20 and emerges from the mixing element 4 via the second outlet opening 8. The fourth substream 32 flows out of the mixing element 4 through the fourth channel 16 and the first outlet opening 7 via the first outlet space 19. The first substream 29 mixes with the fourth substream 32 in the first outlet space 19. In contrast with that, the second substream 30 mixes with the third substream 31 in the second outlet space 20.

What is claimed is:

1. A mixing element for an exhaust system of an internal combustion engine, comprising:
    first and second half-shells, wherein said first and second half-shells are identical parts;
    an insertion plate arranged between said first and second half-shells;
    wherein said first half-shell comprises:
        first and second inlet opening sections;
        first and second outlet opening sections; and
        first and second channel sections that are open toward said second half-shell;
    wherein said second half-shell comprises:
        third and fourth inlet opening sections;
        third and fourth outlet opening sections;
        third and fourth channel sections that are open toward said first half-shell;
    wherein, said first and third inlet opening sections define a first inlet opening and said second and fourth inlet opening sections define a second inlet opening;
    wherein, said first and third outlet opening sections define a first outlet opening and said second and fourth outlet opening sections define a second outlet opening; and
    wherein said first, second, third, and fourth channel sections of said first and second half-shells define a channel system comprising:
        first, second, third and fourth channels respectively;
        wherein said first and second channels connect said first inlet opening to said first and second outlet openings, respectively, and said third and fourth channels connect said second inlet opening to said first and second outlet openings, respectively.

2. The mixing element according to claim 1, wherein said first and third channels connect said first outlet opening to said first and second inlet openings, respectively, and said second and fourth channels connect said second outlet opening to said first and second inlet openings, respectively.

3. The mixing element according to claim 1, wherein said mixing element includes for each of said first and second inlet openings an inlet space from which a channel branches off to said first outlet opening and another channel branches off to said second outlet opening.

4. The mixing element according to claim 1, wherein said mixing element includes for each of said first and second outlet openings an outlet space into which a channel coming from said first inlet opening opens and a channel coming from said second inlet opening opens.

5. The mixing element according to claim 1, wherein said first and second channels assigned to said first inlet opening are arranged in a Y shape, said third and fourth channels assigned to said second inlet opening are arranged in a Y shape, said first and third channels assigned to said first outlet opening are arranged in a Y shape, and said second and fourth channels assigned to said second outlet opening are arranged in a Y shape.

6. The mixing element according to claim 1, wherein said first and fourth channels run essentially parallel to one another, such that the exhaust gas stream through said first and fourth channels does not mix in said mixing element.

7. The mixing element according to claim 1, wherein said second and third channels intersect one another, preferably in such a way that the exhaust gas streams through said second and third channels do not mix in said mixing element.

8. The mixing element according to claim 1, wherein said insertion plate seals said first and second channel sections with regard to the other half-shell.

9. The mixing element according to claim 1, wherein said insertion plate divides the exhaust gas stream into said first and second channels for said first inlet opening and into said third and fourth channels for said second inlet opening.

10. The mixing element according to claim 1, wherein said first, second, third and fourth channels have flow cross sections of approximately same size.

11. The mixing element of claim 1, wherein each of said first and second half-shells is a single stamped part.

12. An exhaust system for an internal combustion engine, comprising:
    first and second exhaust lines which are connected to one another via a mixing element, said mixing element comprising:
        first and second half-shells, wherein said first and second half-shells are identical parts;
        an insertion plate arranged between said first and second half-shells;

wherein said first half-shell comprises:
  first and second inlet opening sections;
  first and second outlet opening sections; and
  first and second channel sections that are open toward said second half-shell;
wherein said second half-shell comprises:
  third and fourth inlet opening sections;
  third and fourth outlet opening sections;
  third and fourth channel sections that are open toward said first half-shell;
wherein, said first and third inlet opening sections define a first inlet opening and said second and fourth inlet opening sections define a second inlet opening;
wherein, said first and third outlet opening sections define a first outlet opening and said second and fourth outlet opening sections define a second outlet opening; and
wherein said first, second, third, and fourth channel sections of said first and second half-shells define a channel system comprising:
  first, second, third and fourth channels;
wherein said first and second channels connect said first inlet opening to said first and second outlet openings, respectively, and said third and fourth channels connect said second inlet opening to said first and second outlet openings, respectively.

13. The exhaust system according to claim 12, further comprises a probe or sensor arranged downstream from said mixing element in at least one of said first and second exhaust lines.

14. The exhaust system according to claim 13, wherein said probe or sensor is adapted for measuring a urea content and/or ammonia content in the exhaust gas.

15. The exhaust system according to claim 12, wherein each of said first and second exhaust lines comprises first and second catalytic converter arrangement upstream from said mixing element.

16. The exhaust system according to claim 15, wherein each of said first and second catalytic converter arrangements operates with at least one of urea and ammonia to reduce nitrogen oxides.

* * * * *